Aug. 3, 1948.                R. J. WOODS                2,446,399
                        AIRCRAFT ENGINE SUPPORT
Filed Jan. 10, 1947                                   2 Sheets-Sheet 1
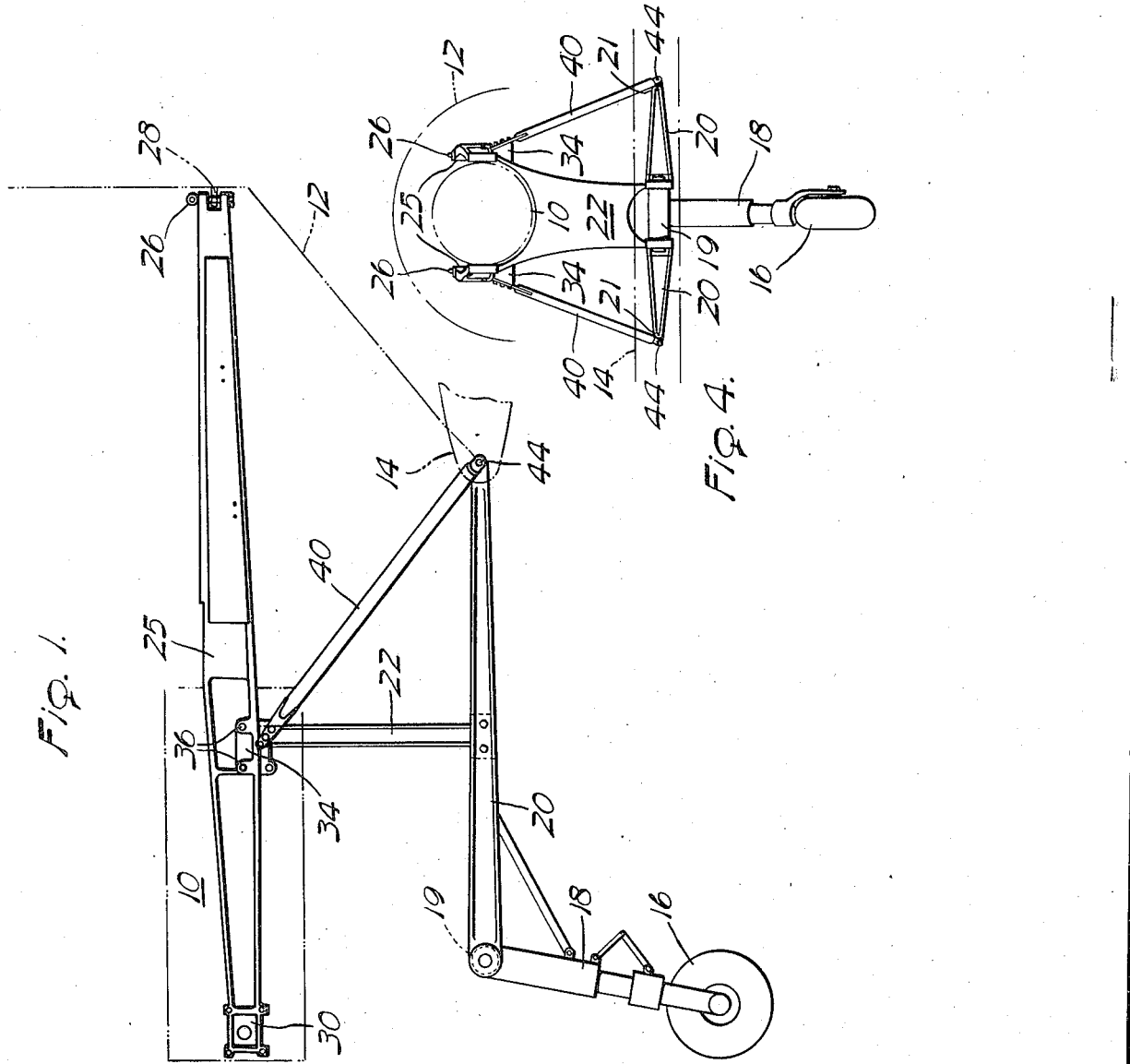
INVENTOR
Robert J. Woods
BY
Bean, Brooks, Buckley & Bean.
ATTORNEYS Aug. 3, 1948.　　　　　R. J. WOODS　　　　2,446,399
AIRCRAFT ENGINE SUPPORT
Filed Jan. 10, 1947　　　　　　　　　　　　2 Sheets-Sheet 2
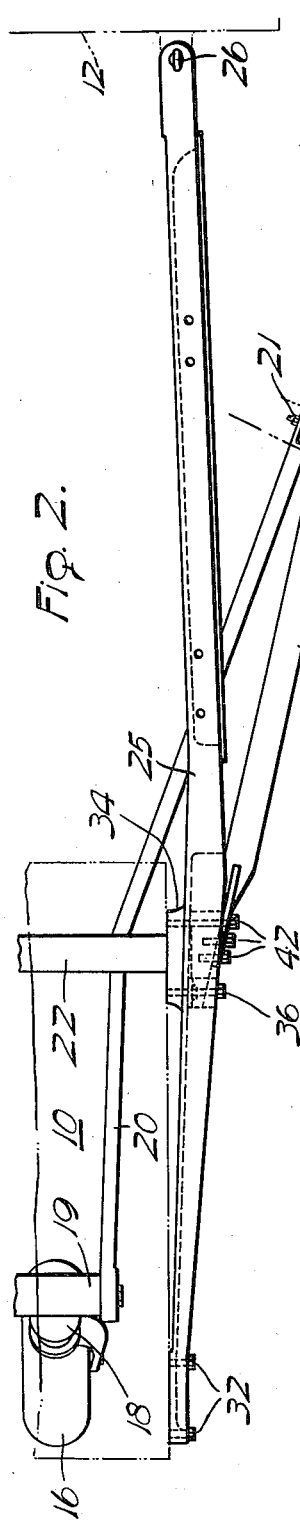
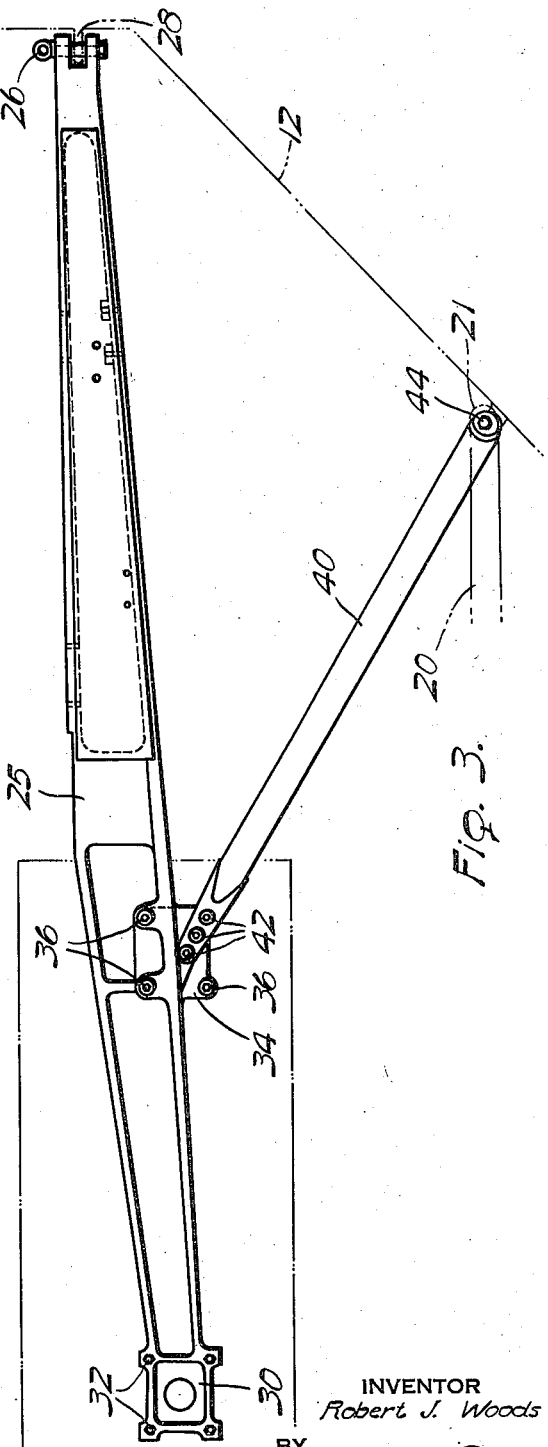
INVENTOR
Robert J. Woods
BY
Bean, Brooks, Buckley & Bean.
ATTORNEYS Patented Aug. 3, 1948

2,446,399

UNITED STATES PATENT OFFICE 2,446,399

AIRCRAFT ENGINE SUPPORT

Robert J. Woods, Grand Island, N. Y., assignor to Bell Aircraft Corporation, Buffalo, N. Y.

Application January 10, 1947, Serial No. 721,381

5 Claims. (Cl. 244—54)

This invention relates to power plant supports, and more particularly to improvements in mounting means for aircraft engines, and to combination aircraft engine and landing gear units.

The invention particularly contemplates a supporting system which is adapted to be provided in the form of a subassembly readily fitted to the primary air frame, and which is so arranged as to utilize the inherent rigidity of the power plant crank case to stabilize the entire mounting system against torsional and lateral deflections; thereby reducing the amount of external bracing required.

Therefore a primary object of the present invention is to provide an aircraft engine mount arrangement of improved simplicity.

Another object of the invention is to provide an aircraft engine mounting and supporting arrangement which employs the inherent rigidity of the mounted engine crank case to provide the requisite bracing of the mounting structure whereby the latter may also be employed to constitute a major supporting element for the aircraft landing gear.

Another object of the invention is to provide an improved combination engine mount and landing gear support structure in aircraft and the like.

Other objects and advantages of the invention will appear from the specification hereinafter.

In the drawings:

Fig. 1 illustrates in side elevation an aircraft engine mount and landing gear supporting structure of the invention;

Fig. 2 is a top plan, on a larger scale, of one side portion of the engine mounting structure;

Fig. 3 is a fragmentary side elevational view corresponding to Fig. 2; and

Fig. 4 is front elevation, on a reduced scale, of the structure of Fig. 1.

The drawings illustrate the invention as applied to the mounting of an aircraft engine having a crank case indicated diagrammatically at 10. The engine is shown as being mounted upon the front end of an air frame indicated diagrammatically at 12. In Fig. 1 the airframe is illustrated to include a wing portion 14 and a front wheel element 16 constituting a portion of the landing gear of the aircraft. The wheel 16 is illustrated to be mounted relative to the aircraft by means of a usual type oleo strut 18 having a cross head 19 pivotally connected for wheel retraction purposes between the forward ends of a pair of horizontal beams 20—20 which extend generally longitudinally of the aircraft and forwardly from spaced points of attachment 21—21 to the airframe 12. The beams 20—20 are vertically braced by means of a truss 22 extending from connections thereto at its opposite bottom ends into connection at its opposite upper ends with the engine mount structure, as will be explained more fully hereinafter.

The engine mount structure of the invention is illustrated in the drawing to comprise a pair of beams 25—25 disposed to extend substantially horizontally and in spaced parallel relation at the opposite sides of the engine block 10; the beams being connected at their rear ends by means of clevis pin devices 26—26 to suitable bracket portions 28—28 of the airframe. At their front ends the beams 25—25 are formed with enlarged pad portions 30 having spaced point connection studs 32 extending therethrough into the front end portion of the engine case. Intermediately of their ends, and adjacent the rear end side portions of the engine case, the beams 25—25 are formed with pads 34—34; and studs 36 are illustrated to bolt the pads 34 into firm connection with the engine crank case. Thus, the front end portions of the beams 25—25 are bolted alongside the engine crank case in such manner as to become structurally integral therewith, whereby the beams reinforce the engine crank case and increase the rigidity thereof against deflections. Conversely, the inherently rigid engine crank case structure thereby mounts the beams 25—25 to extend rigidly therefrom in cantilever fashion.

A diagonal strut 40 is provided to extend into bracing connection with each of the beams 25—25; the upper ends of the struts 40—40 being fixed to the beams in the regions of the beam pads 34 by means of studs 42, and the lower ends of the struts 40—40 being clevis pin connected as at 44 to the airframe 12. The struts 40—40 are disposed to extend obliquely in three directions from the beams 25—25; that is, downwardly and rearwardly as well as outwardly therefrom. Consequently, the connection points 44—44 are below the connection points 28—28 and outwardly therefrom; and the struts 40—40 are so dimensioned as to terminate forwardly of the longitudinal station of the connection points 28—28.

Thus, it will be appreciated that in order for one of the side truss units (comprising one of the beams 25 and the associated strut 40) to be deflected laterally in plan view relative to the airframe such as in response to accelerating loads thereon incidental to maneuvering of the aircraft, it will be necessary for the truss unit to rotate about an axis intersecting the connection points 28—44. Consequently, any tendency of the power plant to be displaced laterally relative to the airframe will be necessarily accompanied by a tendency on the part of the front end of one of the beams to be swung outwardly and upwardly in accompaniment with a tendency of the front end of the other beam to move inwardly and downwardly. Inasmuch as the front end portions of the beams 25—25 are locked into integral connections with the sides of the engine crank case it is impossible for the front ends of the beams 25—25 to assume the hereinabove described relative displacements without deflecting the engine crank case torsionally.

It is well known in the aircraft art that high duty aircraft engines are necessarily designed to incorporate in the crank case portions thereof rigidity strength safety factors sufficient to insure extreme rigidity of the engine casing even under emergency maximum output operating conditions, so as to insure avoidance of binding of the cam shaft and other operating parts. Thus, aircraft engines conventionally embody rigidity characteristics far in excess of those required in normal operation, and the present invention takes advantage of the presence of this excess torsional rigidity in the engine crankcase to provide the requisite bracing for the engine mounting structure. Incidentally, it should be noted that maximum engine supporting loads are usually applied to the engine mount structure only at such times as when the engine is operating under less than maximum output conditions, such as during pull-outs from diving maneuvers or the like.

Also, it is to be noted that landing maneuvers such as impose maximum loads on the aircraft undercarriage are usually experienced only at times when the engine is idling and when the engine supporting loads are minimum and substantially acceleration-free. Therefore, it is entirely practicable to derive the requisite bracing for the landing gear from the mounting structure which also supports the engine, and to thereby again utilize the excess torsional rigidity which is built into the engine crankcase. For this purpose the landing gear frames 20—20 are braced directly against the engine mount structure by means of the vertical truss element 22; the latter being connected to opposite sides of the engine mount structure at the region of connection thereof to the oblique struts 40—40. The truss 22 is designed to be rigid against lateral deflections as well as vertical loadings, and thus the loads upon the landing wheel 16 are directed into the combination truss arrangement comprising the braces 40—40; the beams 25—25; and the airframe 12; thereby to be resisted by the torsional rigidity of the engine crankcase structure. The beams 20—20 are preferably splayed outwardly as they extend rearwardly from the region of their connection to the truss 22 (Figs. 2 and 4) so that their connection points 21—21 to the airframe provide a broad base support for the undercarriage laterally; thereby further stabilizing the entire structure.

Thus, it will be appreciated that the invention provides an extremely light weight, compact, and efficient support for the aircraft engine and landing wheel elements; and that although only one specific application and form of the invention has been shown in detail it will be apparent to those skilled in the art that the invention is not so limited but that various changes may be made therein without departing from the spirit of the invention or the scope of the appended claims.

I claim:

1. A mounting for supporting an aircraft engine and landing gear relative to an airframe, said landing gear comprising a horizontally extending beam structure connected at one end to the airframe, said engine having a substantially rigid crankcase, said mounting including a pair of beams extending substantially horizontally and parallel from spaced connections to said airframe, said beams being disposed at their extending end portions to lie alongside said crankcase at opposite sides thereof, means connecting said beams to the sides of said crankcase so as to become structurally integral therewith, obliquely lateral and vertical brace means connected to said airframe and extending therefrom obliquely towards said beams and into connection with said beams at positions remote from the connections of said beams to said airframe, and vertical truss means extending from said beams for connection to said landing gear structure extending at a position thereon horizontally displaced from said airframe for stabilizing said landing gear structure vertically and laterally and torsionally.

2. In an aircraft having an airframe, an aircraft engine and landing gear supporting structure carried by said airframe, said engine having a substantially torsionally rigid crankcase, said structure including a pair of beams extending substantially horizontally and parallel from spaced connections to said airframe, said beams being disposed at their extending end portions to lie alongside said crankcase at opposite sides thereof, means connecting said beams to the sides of said crankcase so as to become structurally integral therewith, obliquely lateral and vertical brace means connected to said airframe and extending therefrom into connection with said beams at positions remote from the connections of said beams to said airframe, truss means extending vertically from said beams, and a landing gear structure comprising beam means extending substantially horizontally from said airframe and into connection with said vertical truss means, whereby forces tending to displace said landing gear structure and said engine either laterally or vertically are resisted by the torsional rigidity of said crankcase.

3. A mounting for supporting a power plant on a relatively stationary structure, said power plant having a substantially rigid casing, said mounting including a pair of beams extending substantially horizontally and parallel from spaced point connections with said stationary structure, said beams being disposed at their extending end portions to lie along opposite sides of said casing, means rigidly connecting said beams to the sides of said casing so as to become integral therewith, and obliquely lateral brace means connected with said stationary structure at positions laterally offset and outside of the plan view confines of said beams and extending therefrom upwardly and inwardly towards opposite sides of said power plant and into connection with said beams in the region of said casing, whereby said casing and said beams and said stationary structure cooperate to provide a truss which is rigid against lateral and vertical displacements of said power plant relative to stationary structure.

4. A mounting for supporting an aircraft engine and landing gear relative to an airframe, said engine having a substantially rigid crankcase, said mounting including a pair of beams extending substantially horizontally and parallel from spaced connections to said airframe, said beams being disposed at their extending end portions to lie alongside said crankcase at opposite sides thereof, means connecting said beams to the sides of said crankcase so as to become structurally integral therewith, brace means connected to said airframe and extending therefrom vertically obliquely and inwardly toward opposite sides of said beams and into connection with said beams at positions remote from the connections of said beams to said airframe, and vertical truss means extending from said beams for connection to a landing gear structure extending substantially horizontally from said airframe for stabilizing said landing gear structure vertically and laterally and torsionally.

5. In an aircraft having an airframe, an aircraft engine and landing gear supporting structure carried by said airframe, said engine having a substantially torsionally rigid crankcase, said structure including a pair of beams extending substantially horizontally and parallel from spaced connections to said airframe, said beams being disposed at their extending end portions to lie alongside said crankcase at opposite sides thereof, means connecting said beams to the sides of said crankcase so as to become structurally integral therewith, vertical brace means extending inwardly toward said crankcase from opposite sides thereof and connected to said airframe and extending therefrom into connection with said beams at positions remote from the connections of said beams to said airframe, truss means extending vertically from said beams, and a landing gear structure comprising beam means extending substantially horizontally from said airframe and into connection with said vertical truss means, whereby forces tending to displace said landing gear structure and said engine either laterally or vertically are resisted by the torsional rigidity of said crankcase.

ROBERT J. WOODS.

REFERENCES CITED

The following references are of record in the file of this patent:

UNITED STATES PATENTS

| Number | Name | Date |
| --- | --- | --- |
| 1,641,306 | Van Valkenberg | Sept. 6, 1927 |

FOREIGN PATENTS

| Number | Country | Date |
| --- | --- | --- |
| 507,681 | Great Britain | June 20, 1939 |